April 20, 1965    H. W. ENSIGN    3,179,293
TANK FILLING VALVE
Filed Oct. 18, 1962    8 Sheets-Sheet 1
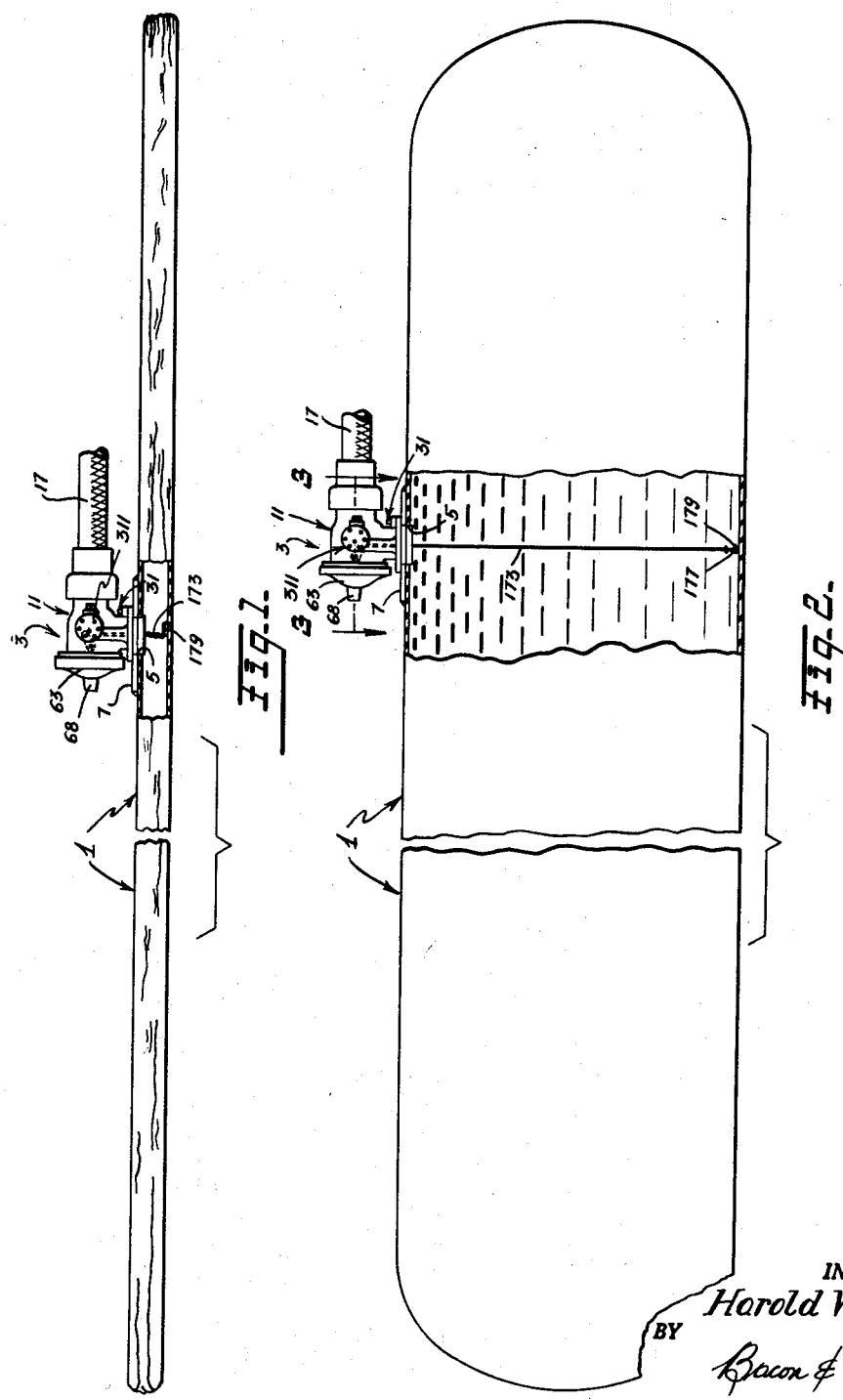
INVENTOR.
Harold W. Ensign
BY
Bacon & Thomas
ATTORNEYS

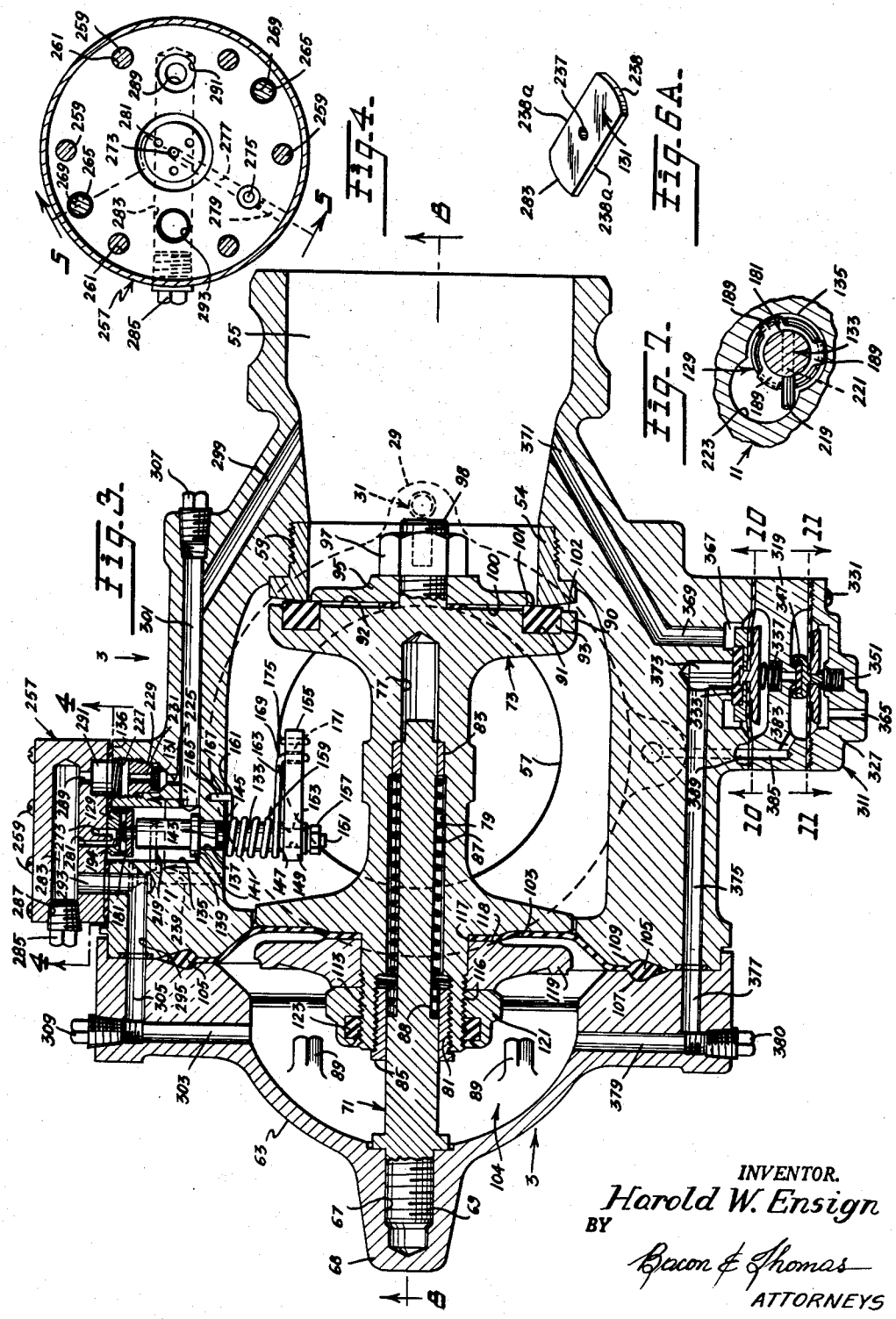

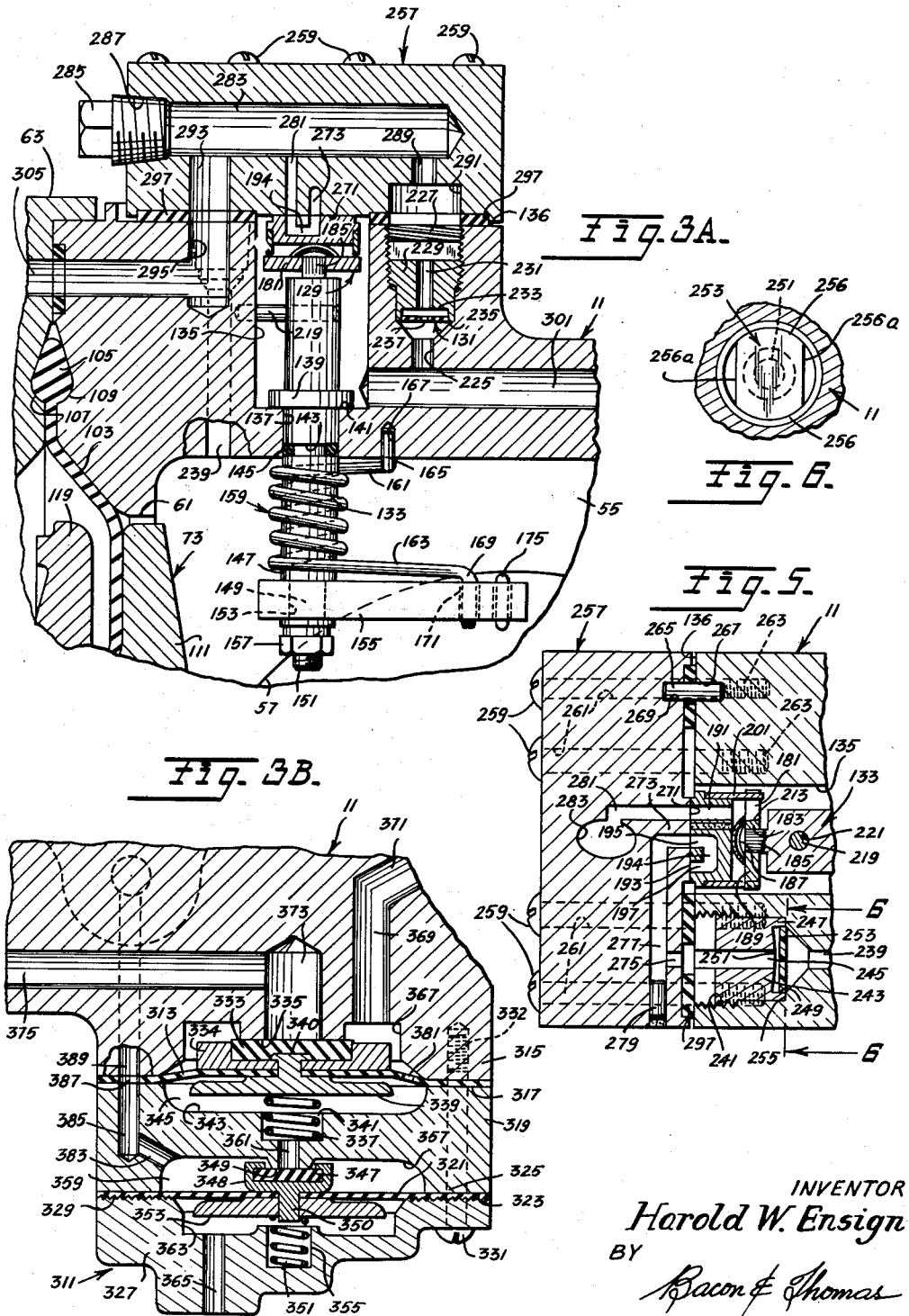

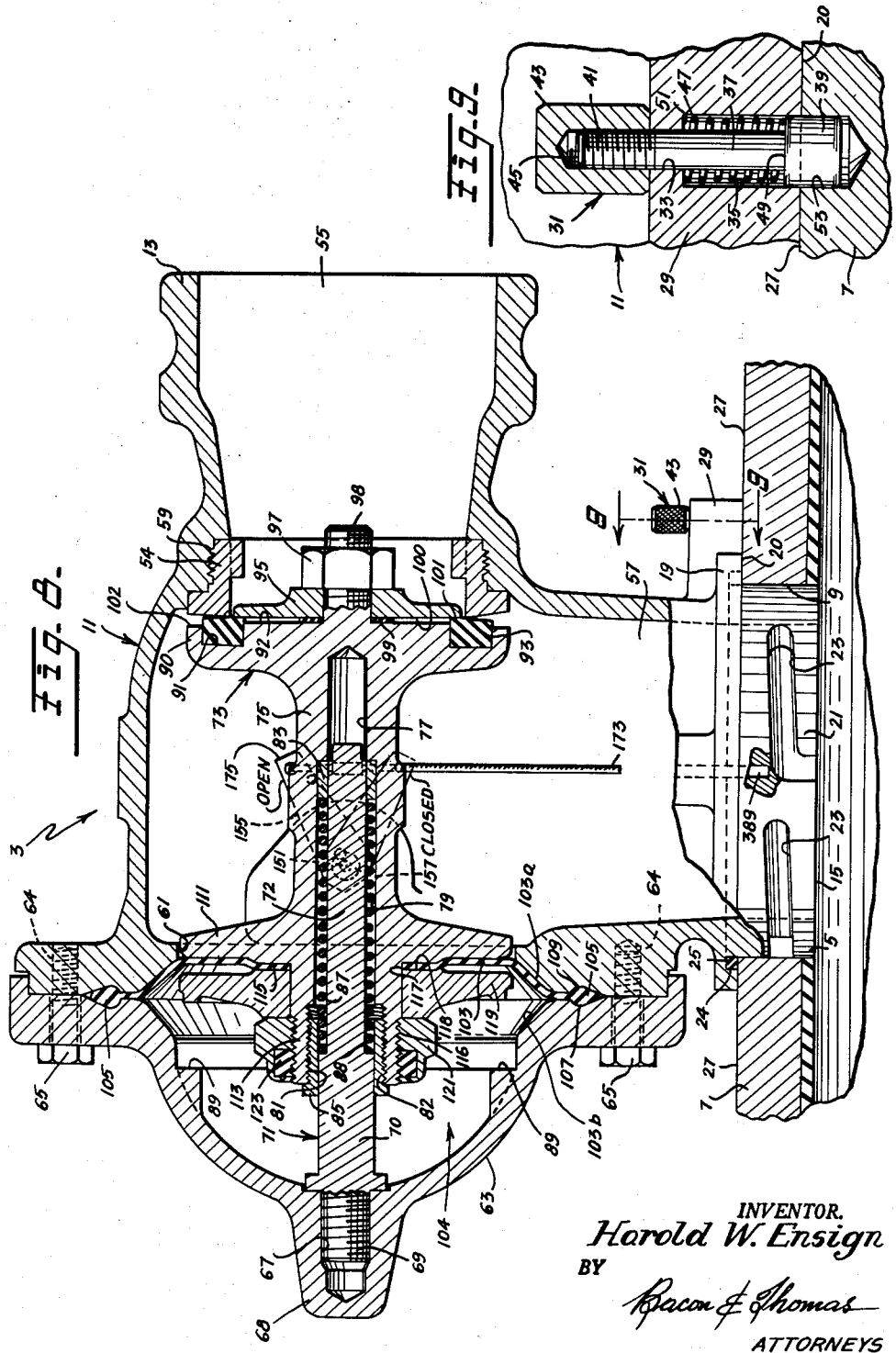

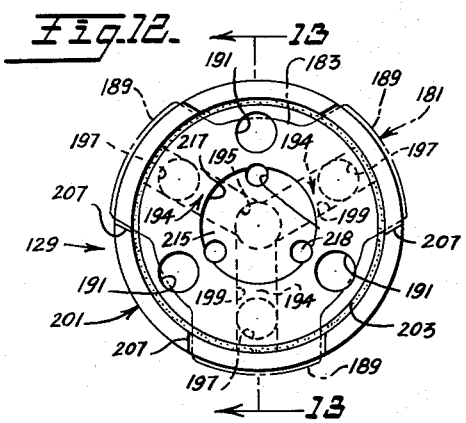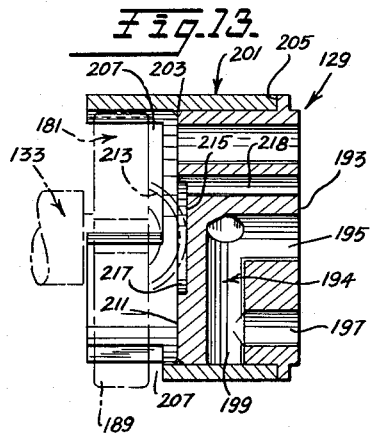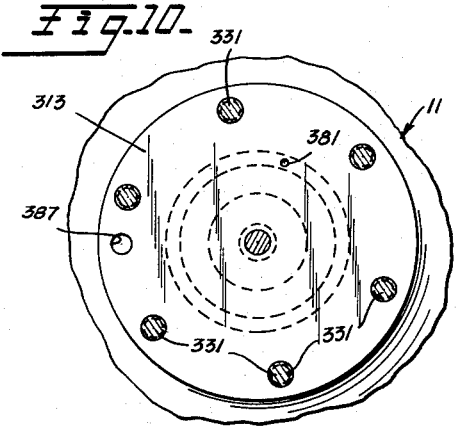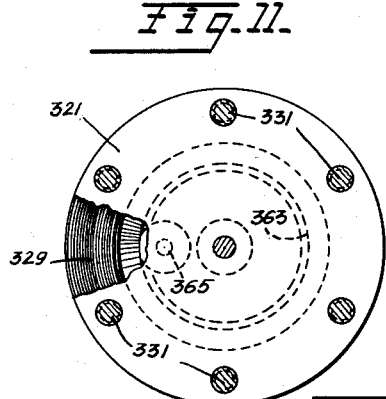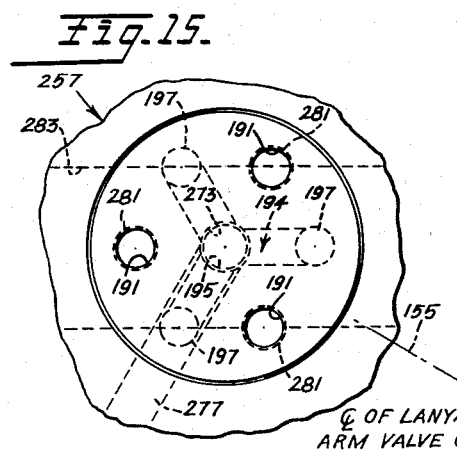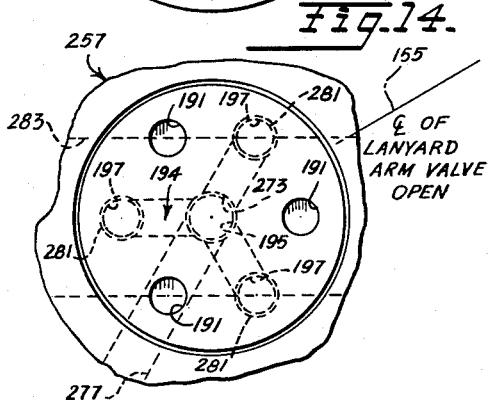

April 20, 1965 H. W. ENSIGN 3,179,293
TANK FILLING VALVE
Filed Oct. 18, 1962 8 Sheets-Sheet 6
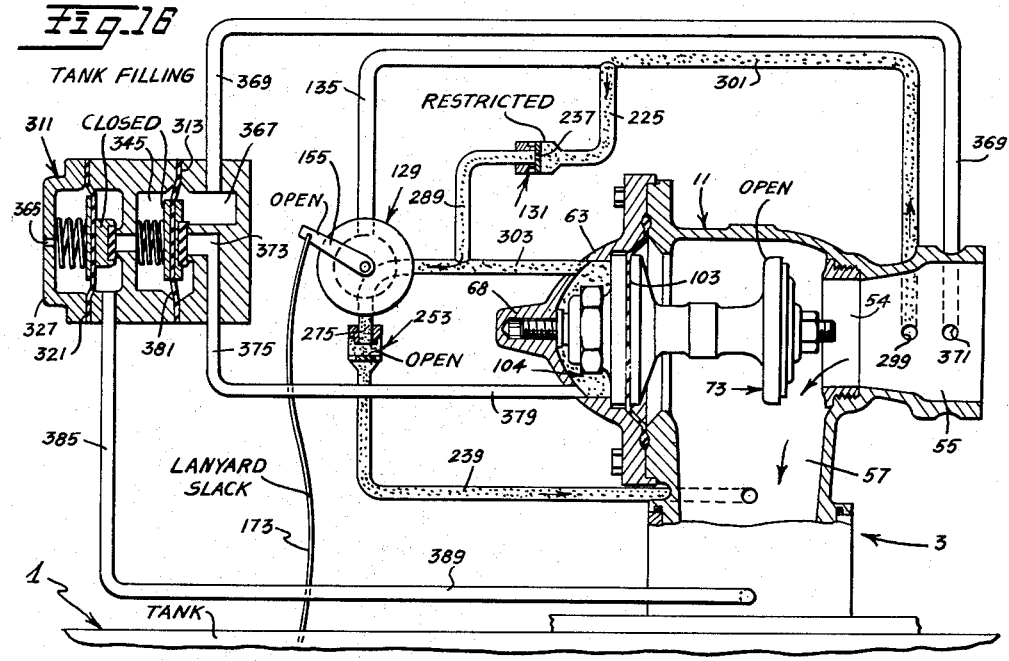
Fig. 16 TANK FILLING
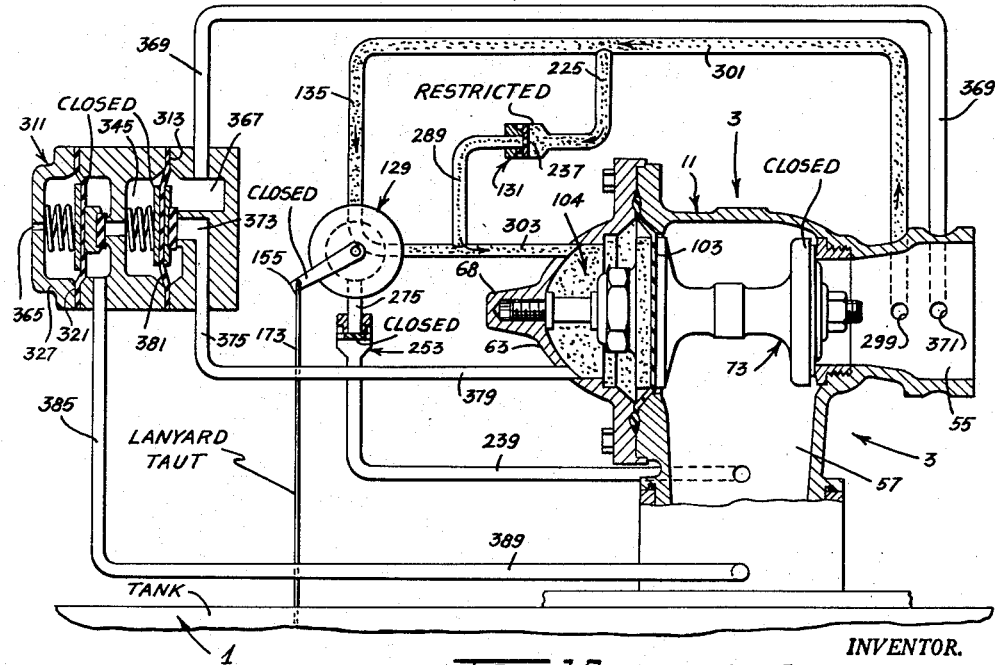
Fig. 17 LANYARD CLOSURE
INVENTOR.
Harold W. Ensign
BY
Bacon & Thomas
ATTORNEYS April 20, 1965 H. W. ENSIGN 3,179,293
TANK FILLING VALVE Filed Oct. 18, 1962 8 Sheets-Sheet 7

EXCESS PRESSURE CLOSURE

TANK EMPTYING
LANYARD CLOSED

INVENTOR.
Harold W. Ensign
BY
Bacon & Thomas
ATTORNEYS

PARTIALLY FILLED TANK EMPTYING

TANK PARTIALLY FILLED STATIC CONDITION

INVENTOR.
Harold W. Ensign

United States Patent Office 3,179,293
Patented Apr. 20, 1965

3,179,293
TANK FILLING VALVE
Harold W. Ensign, Fullerton, Calif., assignor to
Donald G. Griswold, Newport Beach, Calif.
Filed Oct. 18, 1962, Ser. No. 231,342
16 Claims. (Cl. 222—52)

This invention relates to valves, and more particularly to a new and improved valve assembly useful for filling and emptying fuel storage tanks.

In certain refueling systems for aircraft, a series of inflatable, air-transportable, pillow-type tanks are employed. Several of these tanks, together with other components of the system, can be carried to the desired location by a single cargo plane to establish a fueling depot. The principal problem involved resides in providing adequate and satisfactory valving and control means for making such system feasible. The valve of the present invention solves this problem by providing means for readily filling the tanks after they have been positioned in a fueling area, and for quickly withdrawing fuel from such tanks to effect refueling of aircraft.

The present valve assembly provides all of the safety features necessary for this type of operation, in that it does not have any exposed tubing that might be damaged, and all of the essential control valve components either are mounted upon or within the body of the main valve. The main valve itself is of the diaphragm type and is designed so that it can be readily attached and detached from a tank. More specifically, attachment of the valve to an inflatible tank is effected by a simple bayonet type of connection, together with means for locking the valve in any one of four angular positions relative to the inflatible tank. The valve assembly is designed so that the main valve is automatically opened in response to pump pressure during the tank-filling operation, and is also automatically responsive to pump suction during a tank-emptying operation. In this connection, a pilot valve located in the main valve is operated by a lanyard which has one end thereof attached to an operating arm for the pilot valve and its other end connected with the bottom of the tank. The flow of fuel into the tank is automatically shut off through actuation of the pilot valve by the lanyard when the tank is full; the pilot valve at this time functioning to effect automatic closing of the main valve. Fuel can be withdrawn from the tank by applying the suction of the pump to the inlet opening of the main valve which results in producing a suction condition in the diaphragm chamber of the main valve to automatically hold the main valve open to permit fuel to be pumped out of the tank.

The diaphragm of the main valve is actuated by utilizing the fuel being pumped as operating fluid, and the design of the valve body and cover is such that fuel exhausted from the diaphragm pressure chamber is discharged into the tank rather than to the atmosphere, whereby a fire hazard is avoided.

The present valve assembly also includes safety control means for the main valve, which is independent of the lanyard and pilot valve, for effecting automatic closing of the main valve to prevent excess pressure or overfilling, in the event that either the lanyard or the pilot valve fail to function.

The present valve and control means therefor will be described hereinafter in connection with a single inflatible tank, but it is to be understood that similar valve means may be applied to any number of tanks at a fueling depot. It will also be understood that the present valve, by virtue of its pressure-responsive safety control, can also be installed on a rigid tank and automatically effect closing of the main valve connected with such tank in response to pressure building up in said tank.

The principal object of this invention is to provide a tank filling valve for an inflatible tank, and control means for said valve designed to prevent overfilling and/or damage to the tank due to excessive pressure.

Another object is to provide a tank filling valve designed to withstand rough handling, and wherein there is no external tubing or moving parts that would be subject to damage.

Another object is to provide a tank filling valve that will automatically control the flow of fuel therethrough in both directions.

A further object is to provide a tank filling valve with a safety control designed to shut off the flow of fuel into a filled tank upon failure of a main control to do so.

A still further object is to provide a tank filling valve that will automatically close when fluid pressure starts to build up in the tank.

The foregoing and other objects and advantages of the invention will become more apparent from the following description taken in conjunction with the accompanying drawings, in which:

FIG. 1 is a side elevational view, partly in cross-section, of a deflated tank having the filling valve of the present invention mounted thereon;

FIG. 2 is a side elevational view of the tank and filling valve shown in FIG. 1, but with the tank filled;

FIG. 3 is an enlarged horizontal sectional view through the filling valve, taken on the line 3—3 of FIG. 2;

FIG. 3A is an enlarged fragmentary horizontal sectional view of the rotary pilot valve of FIG. 3;

FIG. 3B is an enlarged fragmentary horizontal sectional view of the pressure responsive control valve of FIG. 3;

FIG. 4 is an enlarged vertical sectional view through the pilot valve, taken on the line 4—4 of FIG. 3;

FIG. 5 is an enlarged vertical sectional view through the pilot valve and one check valve in the main valve, taken on the line 5—5 of FIG. 4;

FIG. 6 is an enlarged fragmentary vertical sectional view through the one check valve, taken on the line 6—6 of FIG. 5;

FIG. 6A is an enlarged perspective view of a second check valve in the main valve shown in FIG. 3;

FIG. 7 is an enlarged fragmentary vertical sectional view transverse of the pilot valve drive shaft, taken on the line 7—7 of FIG. 3;

FIG. 8 is a vertical sectional view, partially in side elevation, through the filling valve, taken on the line 8—8 of FIG. 3;

FIG. 9 is an enlarged fragmentary vertical sectional view taken on the line 9—9 of FIG. 8, showing the latching mechanism between the filling valve and the inlet fitting of the tank;

FIG. 10 is an enlarged vertical sectional view through a pressure responsive control for the filling valve, taken on the line 10—10 of FIG. 3;

FIG. 11 is an enlarged vertical sectional view, taken on the line 11—11 of FIG. 3;

FIG. 12 is an enlarged plan view of the pilot valve disc of the present invention, the driver for the disc being shown in dot-and-dash lines;

FIG. 13 is a vertical sectional view through the pilot disc, taken on the line 13—13 of FIG. 12;

FIG. 14 is a fragmentary diagrammatic plan view of the pilot valve disc and distributor in their relative positions corresponding to the open position of the filling valve, and with the ports in the distributor shown slightly enlarged for clarity;

Figure 18:
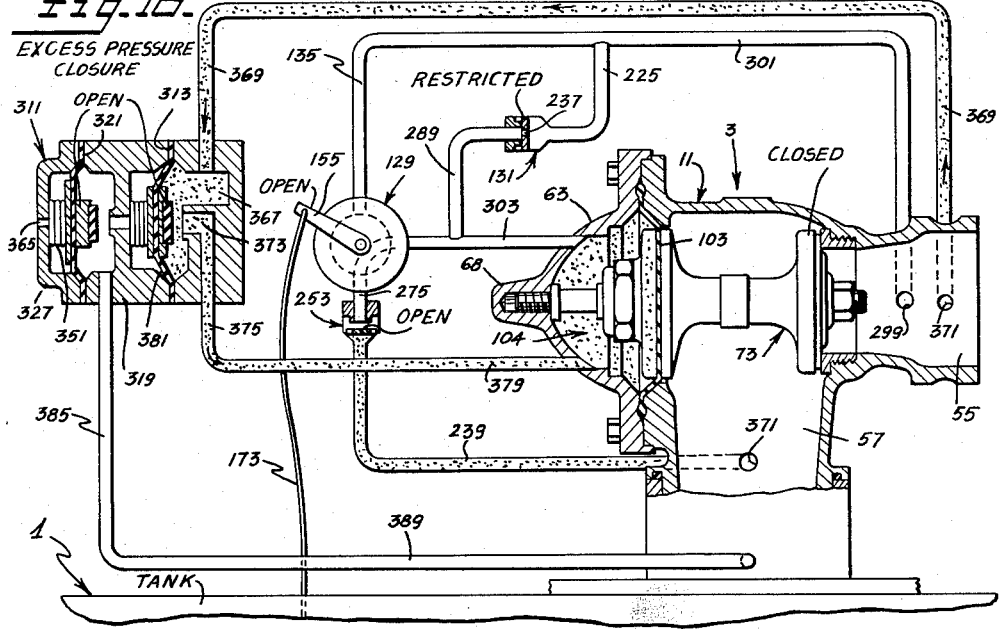

FIG. 15 is a view similar to FIG. 14 but with the pilot valve parts shown in the position they assume corresponding to the closed position of the filling valve; and FIGS. 16–21 are schematic views showing the actuating lanyard and the various operational positions of the tank filling valve and control means of the present invention; the stippled area indicating the essential passage in which pressure or suction is effective to open or close the main valve.

Referring now to FIGS. 1 and 2 of the drawings, an inflatable pillow tank, which may be formed of reinforced rubber, plastic, or other suitable flexible material, is identified by the numeral 1. The fluid capacity of the tank is preferably about 10,000 to 12,000 gallons although larger or smaller tanks may be employed. The tank-filling main valve of the present invention is generally indicated by the numeral 3, and is detachably mounted upon the tank 1 at a point five or six feet from the end of the tank, i.e., at a point that remains substantially horizontal at all times. An opening 5, formed in the upper wall of tank 1 to receive the tank filling or main valve 3, is reinforced by a plate 7, preferably formed of non-corrosive metal, or any other suitable rigid material. Plate 7 is vulcanized, adhesively bonded or otherwise fixedly secured to tank 1, with an opening 9 formed therein in alignment with the opening 5.

The valve 3, FIG. 8, includes a main body portion 11 of angular configuration, having an inlet connection 13 and an outlet connection 15. A flexible hose 17 for filling and emptying the tank 1 is attached to inlet 13, FIGS. 1 and 2, while the outlet connection 15 is inserted into openings 9 and 5 of plate 7 and tank 1, respectively. The outlet connection 15 includes a flange 19 having its lower surface 20 engaged with plate 7 when valve 3 is mounted thereon. A cylindrical boss 21 extends downwardly from flange 19 and is provided on the outer surface thereof with four equally spaced, inclined, bayonet slots 23 arranged symmetrically around boss 21. Suitable lugs, not shown, are provided on the inner surface of plate opening 9 and cooperate with bayonet slots 23 to secure body 11 to plate 7 when the body of the valve is rotated in a clockwise direction, as viewed in FIG. 8. Flange 19 is recessed as at 24 at the point where boss 21 joins the flange to receive a sealing ring 25. The ring 25 is slightly deeper than recess 24 and is compressed to form a fluid-tight seal with the upper surface 27 of plate 7 when tank filling valve 3 is mounted thereon.

In order to prevent the tank filling valve 3 from becoming detached from tank 1, a lateral extension 29 of flange 19, located beneath inlet connection 13, is provided with a latch device generally indicated as 31, and best shown in FIG. 9. The flange extension 29 has a bore 33 and a counterbore 35 extending therethrough. A plunger 37, having an enlarged head 39 at the lower end thereof, is provided with threads 41 at the upper end thereof. The body portion of plunger 37 has a sliding fit in bore 33 while the head 39 has a sliding fit in counterbore 35. A knurled nut 43, having a threaded opening 45, is screw-threaded onto the upper end 41 of plunger 37. In order to urge the enlarged head 39 of plunger 37 downwardly out of counterbore 35, a coiled compression spring 47 is positioned around the body portion of plunger 37 in counterbore 35 with one end bearing against the upper surface 49 of head 39 and the other bearing against a shoulder 51 between counterbore 35 and bore 33. Nut 43 seats on the upper surface of flange extension 29 and is adjusted on thread 41 so that a portion of enlarged head 39 normally extends downwardly out of counterbore 35 to a point below the lower surface 20 of flange extension 29.

The upper surface 27 of plate 7 has four openings 53 symmetrically spaced 90° apart around opening 9, to selectively receive enlarged head 39 of latch 31 when the tank-filling valve 3 is mounted on plate 7. Only one of these openings is shown in FIG. 9, but by using a different one of said openings, the tank-filling valve 3 can be connected to plate 7 and latched thereto in four different angular positions spaced 90 degrees apart to suit installation requirements. When boss 21 is inserted into plate opening 9, and rotated in a clockwise direction to lock valve 3 to the tank, the enlarged head 39 of latch 31 will be aligned with and automatically urged into one of the openings 53 by spring 47, thus preventing the valve from being accidentally detached from tank 1.

The valve 3 can be removed from tank 1 by first lifting the knurled nut 43 to compress spring 47 and disengage head 39 from opening 53, and then turning valve 3 in a counterclockwise direction to free bayonet slots 23 from the lugs, not shown, on the inner surface of opening 9.

A valve seat 54 is mounted in valve body 11, between inlet opening 55 and outlet opening 57, by screw threads 59 formed in body 11. The valve body 11 has an opening 61, axially aligned with inlet opening 55, which is larger than valve seat 54 to permit inserting valve seat 54 into body 11 and threading the valve seat into place.

A dome-shaped cover 63 is attached to the body 11 over opening 61 by bolts 65 passing through suitable openings formed in cover 63 and into threaded openings 64 in body 11. The cover 63 has a threaded opening 67, which extends into an external boss 68 formed at the center of the cover, and receives therein the threaded end 69 of a guide stem 71. The other end 72 of guide stem 71 is plain and smaller in diameter than the body portion 70 of the stem.

A main flow control valve disc assembly, generally indicated by the numeral 73, is mounted for reciprocation upon guide stem 71 and controls the flow of fluid in both directions through main valve 3. The valve disc 73 includes a body portion 75 having a bore 77 and successive counterbores 79 and 81. A bushing 83, having substantially the same outside diameter as counterbore 79 is positioned at the extreme right end of the counterbore. The inner diameter of bushing 83 is slightly smaller than the diameter of bore 77. Counterbore 81 is threaded at 82 and receives therein a threaded bushing 85. The body portion 75 is reciprocatingly mounted on guide stem 71, with bushing 83 sliding on the reduced portion 72 of said guide stem 71 and bushing 85 sliding on the relatively larger portion 70. A coiled compression spring 87 is positioned in counterbore 79 around reduced portion 72 of guide stem 71, with one end bearing against bushing 83 and the other end bearing against a shoulder 88 formed between the stem portions 70 and 72. By means of this arrangement, the valve disc 73 is biased, by spring 87, toward valve seat 54 to close the main valve 3. The extent to which valve disc 73 is permitted to open is limited by abutments 89 formed on the inner wall of cover 63, as is explained more fully hereinafter.

The body portion 75 of valve disc 73, adjacent valve seat 54, is enlarged, as at 90, and is provided with an annual recess 91 in the end face 92 thereof. A resilient rubber ring 93 is seated in recess 91 and cooperates with valve seat 54 to control the flow of fluid through the valve 3. The ring 93 is deeper than recess 91 and extends outwardly toward valve seat 54, beyond the end face 92 of enlarged portion 90, and is secured in recess 91 by a washer 95 and a nut 97 mounted upon a threaded stud 98 extending outwardly from the center of enlarged portion 90. Washer 95 is spaced from the end face 92 of enlarged portion 90 a predetermined distance by a thin washer 99 mounted on the stud 98 between face 92 and washer 95. The inner face 100 of washer 95, adjacent the outer edge thereof, bears on the outer face 101 of ring 93 adjacent the inner periphery thereof to maintain the ring in recess 91. The portion of end face 92 disposed radially outwardly beyond rings 93 is relieved as at 102 in order to prevent contact with valve seat 54 when ring 93 is compressed on valve seat 54. Washer 95 is smaller than the bore of valve seat 54 which it enters.

A flexible diaphragm 103, formed of rubber or other suitable, flexible, impervious material, is secured at the center thereof to valve disc assembly 73, and at the outer periphery thereof between valve body 11 and cover 63 to form with cover 63 a diaphragm pressure chamber 104 for actuating the valve disc assembly 73. The diaphragm 103 is preferably molded so that, in its unflexed state it resembles a segment of a sphere. The object of this is to pre-shape the diaphragm 103 to conform to the inclined diaphragm-supporting walls 103a and 103b on the body 11 and cover 63, respectively, without appreciable stretch.

The outer periphery of diaphragm 103 is provided with an annular bead 105, which is compressed and secured within opposed grooves 107 and 109 formed in the confronting surfaces of the cover 63 and body 11, respectively. The end of body 75 of valve disc assembly 73, opposite the end 90 carrying ring 93 is enlarged, as at 111. A boss 113, extending outwardly from the end face 115 of enlarged portion 111, has threads 116 at its extremity, and projects through an opening 117 in the center of diaphragm 103. The portion of diaphragm 103, surrounding opening 117, is clamped between the end face 115 and the inner face 118 of a washer 119 mounted on boss 113 and secured thereon by locknut 121. The confronting portions of body end 111 and washer 119, extending radially outwardly from faces 115 and 118, respectively, are undercut or relieved to provide a central seat for diaphragm 103. The locknut 121 includes an annular resilient insert 123 adapted to frictionally engage the threads 116 formed on boss 113 to prevent the locknut from backing off the threads.

The valve disc assembly 73 is adapted to be moved from closed to open position against the action of spring 87 by either the pressure of fluid in inlet opening 55 acting on the valve or by induced negative pressure in chamber 104, and is adapted to be moved from open to closed position either by spring 87 or by positive fluid pressure in chamber 104. To this end, a reversible pump, not shown, is connected to hose 17 for filling and emptying tank 1. The positive pressure of the fluid being discharged from the pump and supplied to inlet opening 55 during filling of the tank 1, moves valve disc 73 from closed to open position against the action of spring 87; when the tank 1 is filled, fluid is conducted from inlet opening 55 to chamber 104 to act on diaphragm 103 to actuate the valve disc 73 from open to closed position; and when the tank 1 is being emptied by the suction or negative pressure created by the pump, the negative pressure in inlet opening 55 is applied to chamber 104 to actuate valve disc 73 from closed to open position against the action of spring 87, all as will be explained hereinafter. Opening movement of the valve disc 73 is limited by engagement of washer 119 with abutments 89.

In normal operation, the application of either positive or negative pressure to chamber 104 is controlled by a rotatable pilot disc 129, FIG. 3, and a one-way, check valve 131. The pilot disc 129 is mounted on the outer end of a shaft 133 which extends into an enlarged pressure chamber 135 in the side wall of the valve body 11. The chamber 135 is surrounded by a smooth, flat face 136 formed on the exterior of the valve body 11. The shaft 133 is rotatably mounted in a bore 137, which is smaller in diameter than chamber 135 and extends from the bottom of said chamber to the interior of body 11 at a point on the outlet side of valve disc 73. A shoulder 139 located about midway between the opposite ends of the shaft 133 seats against an abutment 141 between opening 135 and bore 137.

Groove 143 is formed in the portion of shaft 133 confined in bore 137 and contains an O-ring 145 for sealing the shaft in the bore against leakage. The inner end 147 of shaft 133 extends within the body 11 and terminates in a reduced portion 149 and a further reduced threaded end 151. The reduced portion 149 is inserted into an opening 153 formed in one end of a pilot disc operating lever 155 and is keyed or splined thereto in any suitable manner, in order to prevent relative rotation therebetween. A nut 157 is mounted on threaded end 151 and bears against lever 155 to maintain the lever in position on shaft 133. A coil torsion-compression spring 159, having laterally extending upper and lower anchor arms 161 and 163 respectively, as viewed in FIG. 3, is positioned around the inner end 147 of shaft 133 between the interior surface of valve body 11 and lever 155. The extremity of anchor arm 161 is bent upwardly as at 165 and is confined in an opening 167 formed in the side wall of valve body 11. The extremity of anchor arm 163 is bent downwardly, as at 169, and is confined in an opening 171 formed in lever 155 adjacent the free end thereof. The spring 159 biases pilot disc 129 counterclockwise toward OPEN position indicated in FIG. 8, and also maintains shoulder 139 on shaft 133 in contact with abutment 141.

A flexible, non-extensible lanyard 173, FIG. 8, formed of wire cable, chain or the like, is connected at one end 175 thereof to the outer end of lever 155, and is connected at the other end thereof by a swivel type spring-snap 177 (FIG. 2) to a bracket 179 attached to the bottom of tank 1 at a point aligned with the outlet connection 15 of valve 3. When tank 1 is filled to near capacity, lanyard 173 becomes taut and will actuate lever 155 to rotate pilot valve 129 from the "OPEN" to "CLOSED" position indicated in dot-and-dash lines in FIG. 8, by means described hereinafter.

The pilot disc 129 is inter-connected with the shaft 133 by a driver 181, best shown in dot-and-dash lines in FIGS. 12 and 13. The driver 181 includes a hub 183 having a centrally disposed opening to receive a splined portion 185 at the end of said shaft. This end of the shaft is riveted over, as at 187, to retain driver 181 on splined portion 185. Three equally spaced spokes 189, which are adapted to engage pilot disc 129, extend radially outwardly from hub 183.

As is best illustrated in FIGS. 3, 5, 12 and 13, pilot disc 129 is circular and includes three main pressure ports 191 extending therethrough from its flat seating face 193. Ports 191 are spaced 120 degrees apart and are all positioned the same distance radially outwardly from a drain passage 195 at the center of the pilot disc 129. The passage 195 constitutes a portion of three, radially extending U-shaped exhaust ports 194. The U-shaped ports 194 include three axial passages 197, spaced 120 degrees apart, and located midway between adjacent pressure ports 191 and are disposed the same radial distance from passage 195 as the ports 191; and three radial passages 199, extending from the outer periphery of pilot disc 129 to passage 195 to connect the inner end of passages 197 with the common passage 195. The outer end of radial passages 199 is closed by a skirt 201, soldered at 203 to the periphery of pilot disc 129. A shoulder 205, formed on the periphery of pilot disc 129, prevents skirt 201 from extending to the seating face 193. It will thus be seen that three, radially disposed U-shaped exhaust ports 194 having a common center passage 195, are disposed in pilot disc 129 on radii spaced 60° to either side of pressure ports 191.

Pilot disc 129 is connected to driver 181 by inserting the radially extending spokes 189 of the driver 181 into three, equally spaced notches or openings 207 formed in the skirt 201 in the portion thereof that extends beyond the rear face 211 of said pilot disc. A bowed, resilient, disc spring 213, positioned between driver 181 and the bottom 215 of a shallow recess 217 at the center of the face 211 of pilot disc 129 urges said disc outwardly with respect to driver 181 and shaft 133.

In order to conduct fluid through the pilot valve disc 129 to assist in the lubrication thereof, said disc is provided with three small channels 218, which are spaced radially inwardly of pressure ports 191, and extend through said disc from its seating face 193 to recess 217.

As is best shown in FIGS. 3, 3A, 5 and 7, a pin 219, having one end fixed in an opening 221 in shaft 133, extends radially from said shaft and into an enlarged opening 223 of predetermined size formed in body 11 parallel to and in open communication with opening 135 to limit rotation of pilot disc 129 through an angle of 60 degrees. Under all conditions, except when tank 1 is filled, pilot disc 129 is biased to open position by spring 159 with pin 219 in contact with one side wall of opening 223 as shown in FIG. 7. When tank 1 is filled and pilot disc 129 is moved from OPEN to CLOSED position by lanyard 173, pin 219 contacts the opposite side wall of opening 223.

As illustrated in FIGS. 3 and 3A, valve body is provided, adjacent opening 135, with a bore 225 and a threaded counterbore 227 extending inwardly from face 136. A plug 229, which has a centrally disposed opening 231 extending therethrough, is threaded into counterbore 227. The recessed inner end 233 of plug 229 is spaced from the bottom wall 235 of counterbore 227 and provides a seat for cooperation with a plate-type check valve 131. Check valve 131 is elongated and has rounded ends 238 and flat sides 238a, as shown in FIG. 6A; and is provided at the center thereof with a small bleed opening 237 of approximately .040" diameter. Check valve 131 is free to move and engage seat 233 in its closed position, for substantially closing off or restricting flow through opening 231, and to engage wall 235 in its open position for allowing maximum flow. When check valve 131 is in the open position, the rounded ends 238 thereof are seated on wall 235 permitting fluid to flow past the flattened side edges 238a thereof.

As is best shown in FIG. 5, valve body 11 has, adjacent opening 135, a second bore 239 and threaded counterbore 241 extending inwardly thereof from face 136 on the outlet side of valve disc 73. A plug 243, having a central opening 245 is threaded into counterbore 241. The inner end 247 of plug 243 is recessed at 249 and provides a seat 251 for a plate-type check valve 253 confined therein. Check valve 253 is free to move in recess 249 between seat 251, for closing the valve, and bottom wall 255 of counterbore 241 to open the valve. When check valve 253 is in its open position, the rounded ends 256 thereof, FIG. 6, are seated on bottom wall 255 permitting fluid to flow past the flattened side edges 256a thereof.

A distributor housing 257, FIG. 5, is secured to the face 136 of valve body 11 over openings 135, 227 and 241 by screws 259 passing through suitable openings 261 in said distributor housing and into threaded openings 263 in body 11. Dowel pins 265, which are inserted into openings 267 in valve body 11 and into openings 269 in distributor housing 257, accurately position said distributor housing on the valve body. The inner face of distributor housing 257, at the central portion thereof, is engaged by the pilot disc 129 and forms a valve seat 271 therefor.

A passage 273 in distributor housing 257 is in alignment with drain passage 195 of pilot disc 129 and extends into said housing from the center of seat 271. Passage 273 is connected with a passage 275, in alignment with the opening 245 in plug 243, by a passage 277 extending radially inwardly from the periphery of housing 257 and joining the inner ends of passages 273 and 275. The outer end of passage 277 is closed adjacent the periphery of housing 257 by a plug 279 soldered in place in passage 277.

Three passages 281, FIGS. 3A, 5 and 15, which are spaced apart 120 degrees about central passage 273 and disposed on a radius equal to that of ports 191 and passages 197 relative to central passage 195 in pilot disc 129, extend inwardly into distributor housing 257 from seat 271 to a drilled passage 283 projecting diametrically into housing 257 from its periphery at one side thereof. Passages 281 are located in distributor housing 257 so that they register with the exhaust passages 197 of pilot disc 129 when said disc is in its valve opening position (FIG. 14) and aligned with pressure ports 191 when pilot disc 129 is in valve closing position (FIG. 15).

A plug 285 (FIG. 3A) is screwed into threads 287 formed in the outer end of passage 283 and closes the end of said passage. A bore 289 and counterbore 291 are formed in distributor housing 257 in alignment with opening 231 in plug 229 and extend from adjacent the inner end of passage 283 to the adjacent face of said housing, thus interconnecting passage 283 and opening 231. Adjacent the outer end of passage 283, a passage 293 is formed in housing 257 for connecting passage 283 and a passage 295 formed in valve body 11. A gasket 297 is positioned in a recess formed in the housing 257 around the seat 271 to prevent the leakage of fluid between said housing and valve body 11. The gasket 297 is provided with openings that register with passage 293 and countermore 291.

Passages for the flow of fluid under positive pressure, and for transmitting a negative pressure, between main valve inlet opening 55 and pressure chamber 104, are provided in valve body 11, in cover 63 and in distributor housing 257. Thus, the valve body 11, FIG. 3, has drilled passages 299 and 301 which connect inlet opening 55 with chamber 135 containing pilot disc 129, and connect said inlet opening 55 with bore 225 leading to check valve 131. The diaphragm pressure chamber 104 is connected with passage 295 in valve body 11, which leads to the passage 283 connecting with pilot disc chamber 135 and check valves 131 and 253, by drilled passages 303 and 305 formed in cover 63. The outer end of passages 301 and 303 are closed by threaded plugs 307 and 309, respectively.

In the event that lanyard 173 breaks or becomes disconnected, or if rotary pilot disc 129 fails for any reason to be rotated from OPEN to CLOSED position when tank 1 is full, a pressure-responsive control valve, generally indicated by the numeral 311, FIGS. 3 and 3B, is automatically actuated in response to a predetermined positive pressure in the outlet 57 of main valve 3. Actuation of valve 311 permits flow of fluid under pressure from inlet opening 55 to diaphragm pressure chamber 104 to move valve disc 73 to closed position.

The pressure-responsive valve 311 includes a primary diaphragm 313 secured between an outer surface 315 of valve body 11 and the inner surface 317 of a housing 319, and a sensing diaphragm 321 secured between the outer surface 323 of housing 319 and the inner surface 325 of a cover 327. The inner surface 325 of cover 327 has a series of concentric serrations 329 to seal against sensing diaphragm 321. Cover 327, diaphragms 313 and 321 and housing 319 are secured to the outer surface 315 of valve body 11 by screws 331 passing through aligned openings formed therein and into threaded openings 332 formed in body 11.

A primary valve element 333 is seated in a washer 334 attached to the central portion of the inner surface of primary diaphragm 313 and cooperates with a primary valve seat 335 on valve body 11. One end of a compression spring 337 bears against the center of a washer 339, which is engaged with the outer surface of diaphragm 313, while the other end of spring 337 is seated in a bore 341 formed in housing 319 to bias primary valve 333 toward closed position against valve seat 335. The washer 339 has a central stud 340 that projects through an opening in washer 334 and is peened over to secure both washers to the diaphragm 313. Housing 319 is recessed at 343 on the inner surface thereof to form with primary diaphragm 313 an outer fluid pressure chamber 345.

A sensing valve element 347 is mounted in a holder 348 disposed at the central portion of the inner surface of sensing diaphragm 321 and cooperates with a sensing valve seat 349 formed on the outer surface of housing 319. One end of a coiled, calibrated, compression spring 351 bears against the center of a washer 353 engaged with the outer surface of diaphragm 321 while the other end of spring 351 is seated in a recess 355 in cover 327 to bias valve element 347 toward closed position against valve seat 349. The holder 348 has a stem 350 that extends through diaphragm 321 and washer 353 and is peened over to secure these parts in assembled relation. The outer surface of housing 319 is recessed at 357 to form with sensing diaphragm 321 a sensing, fluid pressure chamber 359 for actuating sensing valve element 347. When valve element 347 is in open position, communication between chamber 345 and chamber 359 is established through a passage 361 in housing 319 extending from the bottom of bore 341 through the center of valve seat 349. Cover 327 is recessed at 363 to accommodate washer 353 therein when valve element 347 is actuated to open position. The cover 327 has an opening 365 extending from recess 363 to vent the same to the atmosphere.

An annular recess 367 in valve body 11 surrounds primary valve seat 335 and forms, with the inner face of primary diaphragm 313, an inner fluid pressure chamber that exposes one side of said diaphragm and the outer side of valve seat 335 to the pressure in inlet opening 55 through the passages 369 and 371, FIG. 3, drilled in valve body 11. The inner side of primary valve seat 335 is exposed to the pressure in main diaphragm chamber 104 through drilled passages 373 and 375 in body 11, and passages 377 and 379 drilled in cover 63. The outer end of passage 379, which extends through the outer wall of cover 63 is closed by a threaded plug 380. Diaphragm 313 has a small opening 381, FIG. 3A, of about .031" diameter extending therethrough to permit pressure fluid in chamber 367 to slowly bleed into chamber 345 to equalize the unit pressure on opposite sides of said diaphragm.

One side of valve element 347 is subject to the pressure in chamber 345 through passage 361 and upon unseating of said element, the upper side of diaphragm 321 is similarly subjected to pressure. The upper side of diaphragm 321 is at all times subject to the pressure in the outlet 15 (low pressure side) of valve disc 73 through passages 383 and 385 drilled in housing 319, opening 387 in diaphragm 313, and passage 389 drilled in valve body 11. Passage 389 extends from diaphragm opening 387 to one of the bayonet slots 23, see FIG. 8, employed to connect the tank filling valve 3 to tank 1 for safely disposing of operating fluid.

Spring 351 is so calibrated that sensing valve 347 will be actuated to open position, when tank 1 is full, by fluid pressure in chamber 359 equal to a head of liquid fuel, for example, gasoline, of about 9½ inches. The opening of sensing valve 347 vents chamber 345 through passage 361, chamber 359 and passages 383, 385 and 389 to the outlet 15 of main valve 3, which is at a lower pressure than inlet 55. Upon such venting of chamber 345, the fluid pressure in chamber 367, acting on the upper surface of diaphragm 313, becomes sufficient to move valve element 333 to open position against the bias of spring 337 and to permit the fluid under pressure in inlet opening 55 to flow through passages 371, 369, 373, 375 and 379 to pressure chamber 104 to move valve disc 73 from open to closed position. Valve element 333 will remain open until the pressure in chamber 367 drops to approximately zero p.s.i., gauge, or atmospheric pressure, and will then be moved to closed position by the spring 337.

Pressure responsive control valve 311 may be employed as a safety valve in combination with a mechanically actuated control valve, such as pilot valve 129, to close main valve 3 when tank 1 is full in the event of failure of the pilot valve, or the pilot valve can be omitted and the pressure responsive valve 311 be employed alone on either inflatable or rigid tanks to close the main valve 3 when the tank is full. However, it is preferable to use both the pilot valve 129 and the pressure responsive valve 311 on main valves mounted upon inflatable tanks.

Operation

There are six basic phases in the operation of the present tank filling valve. These phases are diagrammatically illustrated in FIGS. 16-21, inclusive, wherein the stippling represents either positive or negative effective pressures.

In FIG. 16, the tank 1 is in the process of being filled and the main valve 3 and the control means therefor are shown in their corresponding positions. As fluid is being pumped into the tank 1, the lanyard 173 is slack so that the pilot disc 129 is in the OPEN position. That is, it is positioned to allow the main valve 3 to open. The fluid pressure in inlet opening 55 acts upon the valve disc 73 against the action of spring 87 to force said disc away from seat 54 to permit the fluid to flow from inlet opening 55, through valve seat 54 and outlet opening 57 into tank 1. The pilot disc 129 will have vented diaphragm pressure chamber 104 to outlet opening 57 through venting check valve 253 at this time, and the ports in the pilot disc 129 will assume the position, relative to the passages in seat 271, shown in FIG. 14. Check valve 131 is closed, restricting the flow therethrough to that passing through bleed opening 237. This restricted flow is conducted through pilot disc 129 to outlet opening 57 and into tank 1 to prevent pressure from building up in diaphragm chamber 104. Pressure-responsive control valve 311 is closed since the pressure in chamber 345 acting on diaphragm 313 exceeds the effective pressure in chamber 367.

In FIG. 17, the tank 1 has been filled and the main valve disc 73 has been moved to closed position. Pilot valve 129 has been rotated 60 degrees from OPEN to CLOSED position by lanyard 173 and is maintained in closed position by the taut lanyard. The ports in the pilot disc 129 assume a position relative to the passages in the seat 271, as shown in FIG. 15. Fluid pressure in inlet opening 55 has been transmitted through pilot disc 129 to pressure chamber 104 to act on diaphragm 103 to cause it to move the valve disc 73 to its closed position. Spring 87 maintains the valve disc 73 in closed position when pump pressure in inlet opening 55 is discontinued. Restricted check valve 131 is in closed position with no fluid passing therethrough. Venting check valve 253, as well as pressure responsive control valve 311, is closed.

In FIG. 18, the tank 1 has been filled and main flow control valve disc 73 has been moved to its closed position in reponse to excessive fluid pressure in tank 1 and in outlet opening 57. Pilot valve disc 129 is in its OPEN position and lanyard 173 is shown slack, as would be the condition in case of failure, necessitating the valve 311 to take over control and effect closing of the main valve 3. The fluid pressure responsive control valve 311 will have been opened in response to a fluid pressure of more than a 9½ inch head of liquid fuel in tank 1 and in outlet opening 57, thereby connecting the fluid pressure in inlet opening 55 with diaphragm pressure chamber 104 to close valve disc 73. Restricted check valve 131 is closed. A limited amount of fluid flows from inlet opening 55 to outlet opening 57 and into tank 1 through bleed opening 237 in check valve 131. Venting check valve 253 is open, permitting a limited flow of fluid from pressure chamber 104, through pilot valve disc 129, check valve 253 and outlet opening 57 to tank 1. The volume of fluid delivered to tank 1 through restricted check valve 131 and check valve 253 is not sufficient to have any serious effects in tanks of large capacity.

Figure 19:
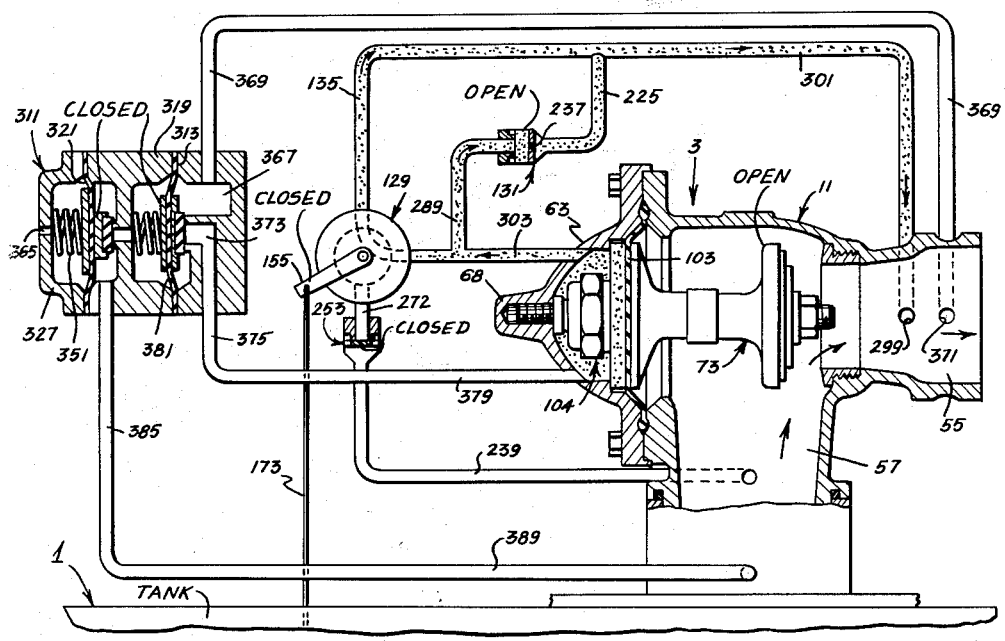

In FIG. 19, tank 1 is full of fluid, valve disc 73 is in open position and the tank is being emptied by the suction of a pump (not shown). Lanyard 173 is taut at the outset, maintaining pilot valve 129 in its CLOSED position. Check valve 131 is open so that suction or negative pressure in inlet opening 55 is conducted through pilot valve disc 129 and check valve 131 to pressure chamber 104, causing the diaphragm 103 to flex toward the left to move valve disc 73 to open position. Venting check valve 253 and pressure responsive control valve 311 are closed. As the tank 1 is being emptied, it will deflate and the lanyard 173 will become slack so that the pilot disc 129 will be moved to its OPEN position without effecting any change in the negative pressure condition in diaphragm chamber 104.

Figure 20:
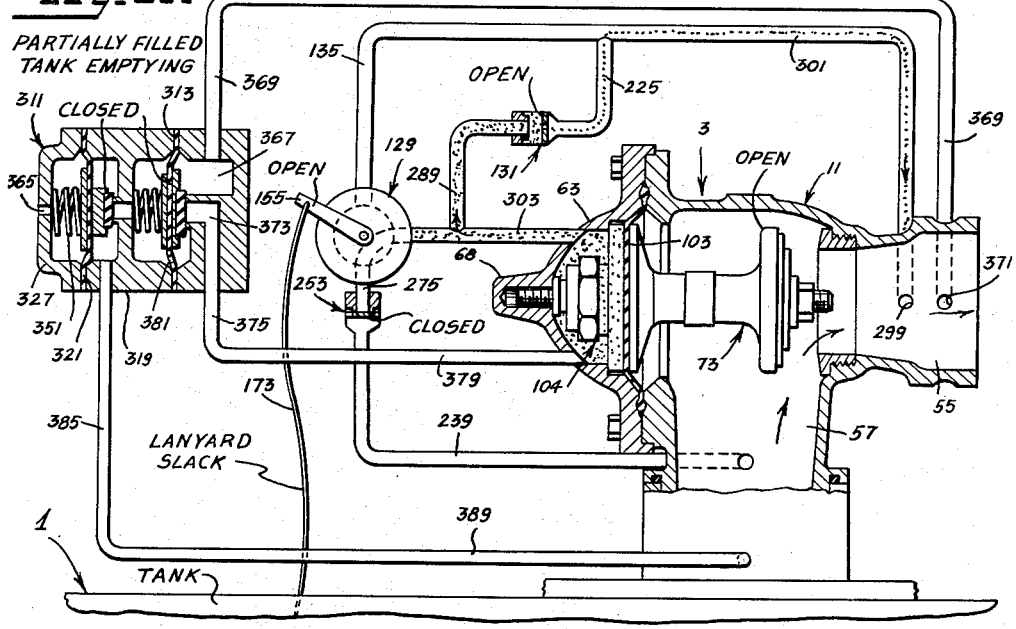

In FIG. 20, tank 1 is only partially filled and is being emptied through open valve disc 73 by the suction of a pump (not shown). Lanyard 173 is slack and pilot valve disc 129 is being held in its OPEN position, by spring 159. Negative pressure or suction in inlet opening 55, conducted to pressure chamber 104 through open check valve 131, holds the main valve disc 73 in open position. Venting valve 253 and pressure responsive valve 311 are closed.

Figure 21:
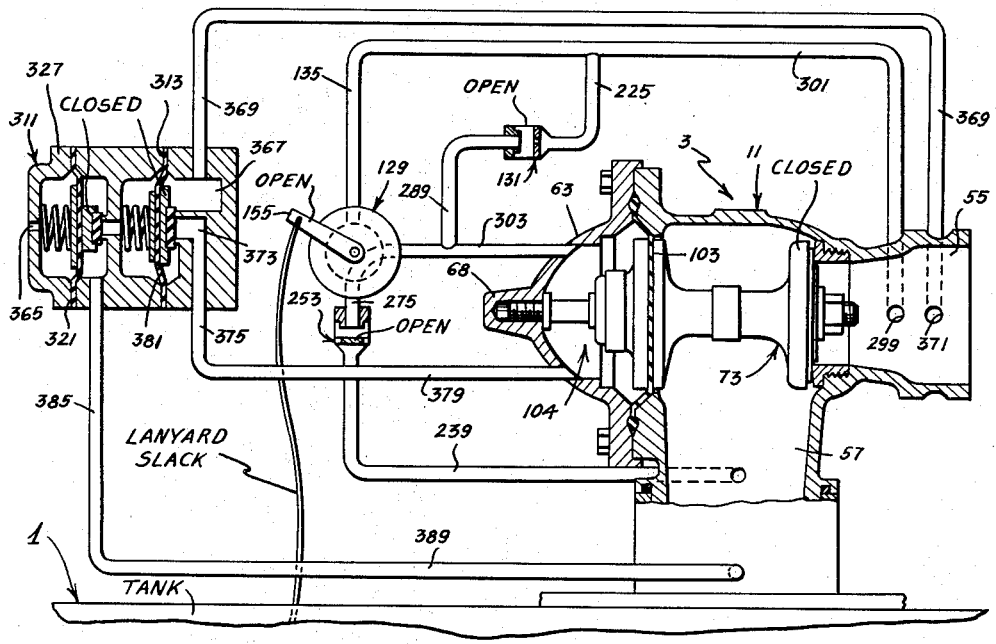

In FIG. 21, the tank is partially filled and main valve disc 73 is in closed position with no positive or negative fluid pressure being applied at inlet opening 55, i.e. a static condition exists. Lanyard 173 is slack and pilot valve disc 129 is in its OPEN position. Restricted check valve 131 and check valve 253 are open to vent diaphragm pressure chamber 104 to inlet opening 55 and outlet opening 57. Pressure responsive valve 311 is closed. Main control valve disc 73 is maintained in closed position by spring 87. The tank 1 may be further filled by pumping fluid thereinto under conditions simulated in FIG. 16, or the tank may be emptied under conditions simulated in FIG. 20.

A preferred embodiment of the invention has been disclosed herein for the purpose of illustration. Such modifications, alterations or substitution of equivalents as would occur to those skilled in the art are to be considered as being encompassed by the principles of the invention and as falling within the scope of the appended claims.

I claim:

1. In combination, an inflatable tank having a bottom wall and a relatively movable upper wall; a main valve mounted upon the upper wall of said tank for controlling the filling and emptying of said tank, said main valve including a fluid pressure operable element movable between open and closed positions for controlling the flow of fluid in either direction therethrough; a pilot valve disposed within said main valve and including a movable member having a first operative position in which it exhausts operating fluid to allow movement of said fluid pressure operable element to valve opening position and having a second operative position in which it supplies operating fluid to effect movement of said fluid pressure operable element to valve closing position; and means for automatically actuating said movable element of said pilot valve from said first operative position to said second operative position in response to the increase in height of said inflatable tank due to filling thereof.

2. The combination defined in claim 1, in which the means for actuating the movable member of the pilot valve comprises an operating arm connected with said movable member; and a lanyard having one end connected with said operating arm and its other end connected with the bottom of the inflatable tank.

3. The combination defined in claim 1, including means normally urging the fluid pressure operable element toward valve closing position, independently of the pilot valve.

4. The combination defined in claim 1, including means yieldably retaining the movable member of the pilot valve in the first operative position.

5. The combination defined in claim 1, including means yieldably retaining the movable member of the pilot valve in the first operative position, and wherein the yieldable means is overcome by the means responsive to the increase in height of the inflatable tank to permit said movable member to be actuated to the second operative position.

6. The combination defined in claim 1, including means responsive to a given pressure condition in the inflatable tank operative to effect closing of the main valve independently of the pilot valve.

7. The combination defined in claim 1, including a fluid pressure-responsive valve communicating with the interior of said main valve and the interior of the inflatable tank arranged to effect closing of said main valve independently of said pilot valve, in response to a predetermined fluid pressure condition existing in said inflatable tank.

8. A tank filling valve, comprising: a body having an inlet and an outlet; fluid pressure operable means in said body controlling the flow from said inlet to said outlet, said body including a recess having a rotatable pilot disc mounted therein and having passage means connecting the inlet of said valve with said recess, said valve including a pressure chamber having a movable wall connected with said fluid pressure operable means, said body also having passage means leading from said pilot disc to said pressure chamber; a shaft connected with said pilot disc for rotating said pilot disc; an operating arm connected with said shaft and disposed within said valve body; means normally urging said operating arm in one direction to position said pilot disc to permit said fluid pressure operable means to be moved to an open position by inlet pressure acting directly thereon; and means for actuating said operating arm from the interior of said valve for positioning said pilot disc to admit operating fluid into said pressure chamber to effect movement of said fluid pressure operable means to its closed position.

9. A tank filling valve to be mounted on a tank for controlling the flow of fluid to and from said tank, comprising: a main valve body having an inlet and an outlet opening; a main valve element movably mounted in said main valve body for movement between open and closed positions to control the flow of fluid therethrough; fluid pressure-responsive means for moving said main valve element from said open to said closed position, first passage means extending from said inlet opening to said fluid pressure-responsive means; a normally closed, fluid pressure actuated control valve controlling the flow of fluid through said first passage means; pressure sensitive means actuated in response to a predetermined positive fluid pressure in the outlet of said main valve body for actuating said control valve; and second passage means extending from said outlet opening to said pressure sensitive means, whereby a predetermined positive pressure in said outlet opening, when said tank is full, actuates said pressure sensitive means to close said filling valve.

10. A tank filling valve to be mounted on the upper wall of an inflatable tank for controlling the flow of fluid to and from said tank, comprising: a main valve body having an inlet and an outlet opening; a normally closed main valve element movably mounted in said main valve body for movement between open and closed positions to control the flow of fluid between said inlet and said outlet openings; fluid pressure-responsive means for effecting movement of said main valve element from said open to said closed position; passage means connecting said inlet opening with said fluid pressure-responsive means; a normally open pilot valve movable between open and closed positions controlling the flow of fluid through said passage means, said pilot valve, when in said open position, preventing the flow of fluid through said passage means; and means responsive to substantially complete inflation of said tank and connected with said pilot valve for moving said pilot valve from said open to said closed position, thereby permitting fluid under pressure in said inlet opening to flow through said passage means to said fluid pressure-responsive means for moving said main valve element from said open to said closed position.

11. A tank filling valve to be mounted on the upper side wall of an inflatable tank for controlling the flow of fluid to said tank, comprising: a main valve body having an inlet opening and an outlet opening; a main flow control valve element mounted in said main valve body for movement between open and closed positions to control the flow of fluid through said main valve body; fluid pressure-responsive means for effecting movement of said main valve element from said open to said closed position, said main valve element being moved from closed to open position by the pressure of fluid in said inlet opening to permit said fluid to flow through said outlet opening and into said tank; first passage means extending from said inlet opening to said fluid pressure responsive means; second passage means extending from said outlet opening to said fluid pressure responsive means; a normally open pilot valve mounted for movement between open and closed positions controlling the flow of fluid through said first and second passage means, said pilot valve, when in open position, permitting the flow of fluid through said second passage means for venting said fluid pressure responsive means to said outlet opening while preventing the flow of fluid through said first passage means, said pilot valve, when in closed position, permitting the flow of fluid through said first passage means while preventing the flow of fluid through said second passage means; and means actuated in response to inflation of said tank to substantially full capacity connected with said pilot valve for moving said pilot valve from said open to said closed position, whereby fluid under pressure supplied through said first passage means from said inlet opening to said fluid pressure responsive means will move said main valve element from said open to said closed position.

12. A tank filling valve to be mounted on a tank for controlling the flow of fluid to and from the tank, comprising: a main valve body having an inlet opening and an outlet opening; a closed fluid pressure chamber in said main valve body having a movable wall; a main flow control valve element mounted in said main valve body and attached to said wall for movement between open and closed positions to control the flow of fluid between said inlet and said outlet opening, said main valve element being moved from closed to open position by the pressure of fluid in said inlet opening to permit said fluid to flow into said tank; first passage means formed in said main valve body connecting said inlet opening with said pressure chamber; a fluid pressure actuated control valve mounted on said main valve body in said first passage means for controlling the flow of fluid therethrough, said fluid pressure actuated control valve including: a fluid pressure actuated primary diaphragm movably mounted on said main valve body, a normally closed, primary valve carried on the inner face of said diaphragm controlling the flow of fluid through said first passage means, an inner fluid pressure chamber communicating with said inner face of said primary diaphragm and with said first passage means for moving said primary valve from closed to open position; an outer fluid pressure chamber communicating with the outer surface of said primary diaphragm for maintaining said primary valve in closed position, a fluid pressure actuated sensing diaphragm movably mounted on said main valve body, a normally closed sensing valve carried on the inner surface of said sensing diaphragm, a sensing-fluid pressure chamber communicating with the inner surface of said sensing diaphragm, second passage means formed in said main valve body connecting said outer primary pressure chamber to said sensing pressure chamber, said sensing valve controlling the flow of fluid through said second passage means, third passage means formed in said main valve body connecting said outlet opening to said sensing pressure chamber, whereby a predetermined positive fluid pressure in said outlet opening is conducted through said third passage means to said sensing pressure chamber to move said sensing valve from closed to open position to vent said outer pressure chamber to said outlet opening, said pressure in said inlet opening being conducted through said first passage means to said inner pressure chamber for moving said primary valve from closed to open position permitting fluid under pressure in said inlet opening to flow through said first passage means to said closed fluid pressure chamber for moving said main valve element from open to closed position.

13. In combination, an inflatable tank; a tank filling valve mounted on the upper side wall of said inflatable tank for controlling the flow of fluid to the tank, said valve comprising a main valve body having an inlet opening and an outlet opening; a closed fluid pressure chamber in said main valve body having a movable wall; a reciprocating main valve element mounted in said main valve body and attached to said wall for movement between open and closed position to control the flow of fluid between said inlet and said outlet openings; means biasing said main valve element toward said closed position, said main valve element being moved from closed to open position by the pressure of fluid in said inlet opening to permit said fluid to flow into said tank; first passage means formed in said main valve body extending from said inlet opening to said pressure chamber for conducting fluid from said inlet opening and said pressure chamber; second passage means formed in said main valve body extending from said outlet opening to said pressure chamber for venting said pressure chamber; a pilot main valve rotatably mounted in said valve body for movement between an open and a closed position controlling the flow of fluid through said first and said second passage means, means normally biasing said pilot valve to open position, said pilot valve, when in said open position, permitting the flow of fluid through said second passage means while preventing the flow of fluid through said first passage means, said pilot valve, when in said closed position, permitting the flow of fluid through said first passage means while preventing the flow of fluid through said second passage means; a flexible, non-extensible member connected at the end thereof to said pilot valve and at the other end thereof to the lower side wall of said tank for rotating said pilot valve from said open to said closed position in response to filling of said tank, said member being drawn taut upon inflation of said tank to full capacity to thereby effect rotation of said pilot valve from said open to said closed position, whereby fluid under pressure conveyed through said first passage means from said inlet opening to said pressure chamber moves said main valve element from said open to said closed position.

14. A tank filling valve to be mounted on a tank for controlling the flow of fluid to and from the tank, comprising: a main valve body having an inlet opening and an outlet opening; a closed fluid pressure chamber in said main valve body having a movable wall; a normally closed main valve element mounted in said body and attached to said wall for movement between open and closed positions to control the flow of fluid through the filling valve; said main valve element being moved from said closed to said open position by the pressure of said fluid in said inlet opening to permit said fluid to flow through said outlet opening and into said tank; first passage means connecting said inlet opening to said pressure chamber; a normally open pilot valve mounted for movement between open and closed position controlling the flow of fluid through said first passage means, said pilot valve, when in said open position, preventing the flow of fluid through said first passage means, said pilot valve, when in said closed position, permitting the flow of fluid through said first passage means; second passage means connecting said inlet opening with said pressure chamber; a one-way restricted check valve positioned in said second passage means permitting the free flow of fluid from said pressure chamber to said inlet opening while restricting the flow of fluid from said inlet opening to said pressure chamber; means connected with said pilot valve for moving said pilot valve from said open to said closed position as said tank becomes substantially full, said wall of said pressure chamber being movable in response to a negative pressure in said pressure chamber to move said valve element from said closed position to said open position for permitting fluid to be withdrawn from said tank through said filling valve, said negative pressure being applied to said inlet opening and conveyed to said pressure chamber through said first and second passage means when said tank is substantially full and said negative pressure in said inlet opening being conveyed to said pressure chamber through only said second passage means when said tank is only partially full.

15. In a tank filling valve to be mounted on an inflatable tank for controlling the flow of fluid to and from the tank, a main valve body having an inlet opening and an outlet opening; a normally closed main valve element mounted in said main valve body for movement between open and closed positions to control the flow of fluid between said inlet opening and said outlet opening; fluid pressure-responsive means for moving said main valve element from said open to closed position, said main valve element being moved from said closed to said open position by fluid supplied under pressure to said inlet opening to permit said fluid to flow through said outlet opening and into said tank; first fluid passage means extending between said inlet opening and said fluid pressure-responsive means for conducting fluid under pressure from said inlet opening to said fluid pressure-respsonsive means for moving said main valve element from said open to said closed position; a normally open pilot valve mounted for movement between open and closed position controlling the flow of fluid through said first passage means, said pilot valve, when in said open position, preventing the flow of fluid through said first passage means, said pilot valve, when in said closed position, permitting the flow of fluid through said first passage means; second passage means connecting said inlet opening with said fluid pressure-responsive means; a one-way, restricted check valve positioned in said second passage means permitting the free flow of fluid from said fluid pressure-responsive means to said inlet opening while restricting the flow of fluid from said inlet opening to said fluid pressure-responsive means; means responsive to substantially complete inflation of said tank connected with said pilot valve for moving said pilot valve from said open to said closed position; and means actuated by fluid under pressure in said outlet opening higher than atmospheric pressure operable for connecting said fluid under pressure in said inlet opening to said fluid pressure-responsive means for moving said main valve element from said open to said closed position.

16. In a tank filling valve to be mounted on an inflatable tank for controlling the flow of fluid to and from the tank, a main valve body having an inlet opening and an outlet opening; a normally closed main valve element mounted in said main valve body for movement between open and closed positions to control the flow of fluid between said inlet opening and said outlet opening; fluid pressure-responsive means for moving said main valve element from said open to said closed position, said main valve element being moved from said closed to said open position by fluid supplied under pressure to said inlet opening to permit said fluid to flow through said outlet opening and into said tank; first fluid passage means extending between said inlet opening and said fluid pressure-responsive means for conducting fluid under pressure from said inlet opening to said fluid pressure-responsive means for moving said main valve element from said open to said closed position; a normally open pilot valve mounted for movement between open and closed position controlling the flow of fluid through said first passage means, said pilot valve preventing the flow of fluid through said first passage means, when in said open position, while permitting the flow of fluid through said first passage means when in said closed position; second passage means connecting said inlet opening with said fluid pressure-responsive means; a one-way restricted check valve positioned in said second passage means permitting the free flow of fluid from said fluid pressure-responsive means to said inlet opening while restricting the flow of fluid from said inlet opening to said fluid pressure-responsive means; third passage means connecting said fluid pressure-responsive means with said outlet opening for venting said fluid pressure-responsive means, said pilot valve controlling the flow of fluid through said third passage means, said pilot valve permitting the flow of fluid through said third pasage means when in its open position while preventing the flow of fluid therethrough when in said closed position; and a one-way check valve in said third passage means permitting the flow of fluid from said fluid pressure-responsive means to said outlet opening while preventing the flow of fluid from said outlet opening to said fluid pressure-responsive means.

References Cited in the file of this patent

UNITED STATES PATENTS

| | | |
|---|---|---|
| 2,363,123 | Franck | Nov. 21, 1944 |
| 2,819,679 | Wilson | Jan. 14, 1958 |
| 2,938,550 | Klamm et al. | May 31, 1960 |